US008725468B2

(12) United States Patent
Daudet et al.

(10) Patent No.: US 8,725,468 B2
(45) Date of Patent: May 13, 2014

(54) METHOD AND DEVICE FOR FREQUENCY ANALYSIS OF DATA

(75) Inventors: Cecile Daudet, Fonsorbes (FR); Patrice Michel, Merville (FR)

(73) Assignee: Airbus Operations S.A.S., Toulouse (FR)

(*) Notice: Subject to any disclaimer, the term of this patent is extended or adjusted under 35 U.S.C. 154(b) by 539 days.

(21) Appl. No.: 13/002,911

(22) PCT Filed: Jul. 6, 2009

(86) PCT No.: PCT/FR2009/000833
§ 371 (c)(1),
(2), (4) Date: Jan. 6, 2011

(87) PCT Pub. No.: WO2010/004133
PCT Pub. Date: Jan. 14, 2010

(65) Prior Publication Data
US 2011/0119041 A1 May 19, 2011

(30) Foreign Application Priority Data
Jul. 7, 2008 (FR) .................................... 08 54622

(51) Int. Cl.
G06F 7/60 (2006.01)
G06F 17/10 (2006.01)

(52) U.S. Cl.
USPC .......................................................... 703/2

(58) Field of Classification Search
USPC .......................................................... 703/2
See application file for complete search history.

(56) References Cited

U.S. PATENT DOCUMENTS

| 4,535,629 | A  | * | 8/1985 | Prine | 73/587 |
|---|---|---|---|---|---|
| 5,675,506 | A  | * | 10/1997 | Savic | 702/51 |
| 7,136,794 | B1 | * | 11/2006 | Bechhoefer | 703/7 |
| 2004/0189277 | A1 | | 9/2004 | Michel | |
| 2004/0215419 | A1 | * | 10/2004 | Havens | 702/178 |
| 2004/0267478 | A1 | | 12/2004 | Goodman et al. | |

FOREIGN PATENT DOCUMENTS

WO     03 005229     1/2003

OTHER PUBLICATIONS

Papakos, V. et al., "Multichannel Identification of Aircraft Skeleton Structures Under Unobservable Excitation: A Vector AR/ARMA Framework", Mechanical Systems and Signal Processing, vol. 17, No. 6, pp. 1271-1290 (2003) XP-002531050.
Jiang, X. et al., "A Time Varying Coefficient Vector AR Modeling of Nonstationary Covariance Time Series", Signal Processing, vol. 33, No. 3, pp. 315-331 (Sep. 1993) XP-000445886.
Omenzetter, P. et al., "Application of Time Series Analysis for Bridge Monitoring", Smart Materials and Structures, vol. 15, pp. 129-138 (2006) XP-20105328A.

(Continued)

Primary Examiner — Dwin M Craig
(74) Attorney, Agent, or Firm — Oblon, Spivak, McClelland, Maier & Neustadt, L.L.P.

(57) ABSTRACT

The data frequency analysis method comprises: a step for inputting signals coming from a first sensor; a step for inputting signals coming from at least a second sensor, each second sensor being positioned close to the first sensor so that the signals coming from each second sensor are strongly correlated with the signals coming from the first sensor; a step of estimating, for each sensor, a transfer function or model established from the combination of the signals from the first sensor and from each second sensor; and a step of extracting the structural properties of the system from each of the estimated models.

15 Claims, 8 Drawing Sheets

(56) References Cited

OTHER PUBLICATIONS

Omenzetter, P. et al., "Identification of Unusual Events in Multi-Channel Bridge Monitoring Data", Mechanical Systems and Signals Processing, vol. 18, pp. 409-430 (2004) XP-002531051.

Peeters, B. et al., "Evaluation of Structural Damage by Dynamic System Identification", Preceedings of ISMA 21, pp. 1-14 (1996) XP-002531052.

Lardies, J. et al., "A New Method for Model Order Selection and Modal Parameter Estimation in Time Domain", Journal of Sound and Vibration, vol. 245, No. 2, pp. 187-203 (2001) XP-002531053.

Spiridonakos, M. et al., "Parametric Identification of a Time-Varying Structure Based on Vector Vibration Response Measurements", Mechanical Systems and Signal Processing, vol. 23, pp. 2029-2048 (2009) XP-002531054.

International Search Report Issued Nov. 5, 2009 in PCT/FR09/000833 filed Jul. 6, 2009.

* cited by examiner

METHOD AND DEVICE FOR FREQUENCY ANALYSIS OF DATA

BACKGROUND

The present invention relates to a method and a device for frequency analysis of data. It is applicable in particular to the analysis of test data for expanding the flight envelope of airplanes.

The present invention is applicable in particular, within the aeronautical sector, to flight commands, for example, the analysis and control of vibrational modes of the structure during flight, within the automobile sector, to studies and controls of vehicle vibrations, in electrodynamics (control of electricity-generating machines), especially in the nuclear sector, to vibrational monitoring of the reactor core, in mechanics (study and control of moving parts), in seismics (study of signals used in oil exploration) and in zoology (study of sounds emitted by animals).

The objective of the present invention is to estimate, in the course of testing (during flight in the case of an airplane), the characteristics of the vehicle and in particular the resonance frequencies and the spectral characteristics. In other words, this involves extracting, from the very large quantity of information items originating from transducers installed in the vehicle, the pertinent signatures very rapidly, even in real time.

The set of characteristics of the system determined in this way permits the designers to improve the structure of the system with a view to increasing its comfort, its flight envelope, its consumption, etc.

The signals that we wish to analyze are composed of noise, to which there is or are added one or more sinusoidal signals, whose frequencies and amplitudes are capable of varying in the course of time. This involves estimating these frequencies and these amplitudes in real time.

Within the field of aeroelasticity, a discipline studying the interactions between the aerodynamics, the inertial and elastic forces, the phenomenon of flutter is a very dangerous oscillatory instability of the airplane structure (wing unit, fuselage, tailplane, etc.), since it is capable of affecting the integrity of this structure by damaging it as far as rupture. It is a combination of two or more movements, of different nature, of the airplane structure, which movements, together with the appropriate phase differences, permit aerodynamic forces to input energy into the system. The stable phenomenon is then transformed into an unstable phenomenon in which the energy is no longer dissipated: this is mode coupling. The most commonly cited example is flutter of the wing unit resulting from coupling between the bending and torsion modes, which in phase quadrature lead to aerodynamic lift forces in the same direction as the displacement and in this way to divergent oscillations.

Several parameters have an influence in characterization of flutter: the mass, the stiffness, the shape of the structure, as well as the operational conditions, such as speed. In order to guard against this phenomenon, the aircraft manufacturers must study it and, it if exists, demonstrate that its occurrence threshold is situated above the maximum operating speed (plus 15%). Wind-tunnel tests are conducted first of all, supplemented by vibration tests of the airplane structure on the ground. Theoretical studies then make it possible to define a flutter-free zone, from which full expansion of the flight envelope will be possible incrementally by "exciting" the airplane structure.

Methods of identifying modal parameters are used to extract, in quasi-real time, the values of frequency and damping and to study their evolution in the flight envelope. Analysis of temporal data obtained from flutter tests is complex: the data are obscured by noise and must be shaped by signal processing (especially filtering and sub-sampling). Numerous transducers are now used to extract the modal parameters of the aero-elastic structure "globally" and automatically.

The known document WO 03005229 describes a system for frequency analysis of signals emitted by a transducer. However, the resolution of this analysis is limited.

The present invention aims to remedy these disadvantages.

SUMMARY OF THE INVENTION

For this purpose, the present invention relates, according to a first aspect, to a method of frequency analysis of a system, characterized in that it includes:
 a step of inputting signals emitted by a first transducer,
 a step of inputting signals emitted by at least one second transducer, each second transducer being positioned close to the first transducer, so that the signals emitted by each second transducer are strongly correlated with the signals emitted by the first transducer,
 a step of estimating, for each transducer, a transfer or model function constructed from the set of signals of the first transducer and each second transducer, and
 a step of extracting structural properties of the system from each of the estimated models.

A model considers the signal emitted by a transducer as the output of a filter excited by white noise. The structural properties include, for example, the spectral properties, the frequencies, amplitudes, original phases, damping phenomena, modes.

In this way the model representative of the structural modes is considered to be linear. By virtue of the employment of the present invention, real-time processing is achieved by following frequency/damping couples on line. The present invention makes it possible to be certain in real time that the behavior of the system, for example of the airplane, is satisfactory, since structural properties of the system are available in real time. In this way the analysis methods used are improved while meeting the increasing constraints of time savings and therefore cost reductions.

According to particular characteristics, in the course of the estimation step, the signals emitted by transducers are considered as polynomials. By virtue of these provisions, the representation of signals is compact, because of the fact that the number of polynomial coefficients is very much smaller than the number of signal samples employed.

According to particular characteristics, in the course of the estimation step, a linear recurrent equation with coefficients varying slowly in time and in space between the transducers is solved.

According to particular characteristics, the estimation step includes:
 a step of recursive adaptive modeling over time, order and space of the transducers, and
 a step of estimating modes for each order according to the result of the adaptive modeling step.

According to particular characteristics, each step of inputting signals emitted by transducers includes a step, preceding the step of adaptive modeling, of reducing, in real time, the level of noise of signals emitted by transducers.

According to particular characteristics, the step of estimating modes includes a step of extracting parameters from the model according to the result of the adaptive modeling step.

According to particular characteristics, the step of extracting parameters from the model includes a step of inverting a polynomial matrix of order N and of dimensions equal to the number of transducers.

According to particular characteristics, the step of estimating modes is adapted to furnish the parameters of each of the models constituting a set of redundant information items, which makes it possible to reduce the variance of the estimated modes.

According to particular characteristics, the step of adaptive modeling achieves modeling of the ARMA type ("Autoregressive Moving Average").

According to particular characteristics, the said modeling of ARMA type is effected at each instant, for each transducer and for all orders under consideration.

According to particular characteristics, the estimation step includes a step of inverting a polynomial matrix, which is a symmetric inter-spectral matrix representing the spectral power density of each of the transducers on its main diagonal and the inter-spectra in the other entries.

According to particular characteristics, the step of adaptive modeling includes recursion of the following steps over time, over the order of the model for N=[1, 2, ..., Nmax] and the number of transducers:

calculation of backward and forward linear prediction error vectors, calculation of forward and backward partial correlation matrices, calculation of backward and forward linear prediction error covariance matrices, calculation of the forward and backward linear prediction error power matrix, direct calculation of gain vectors $$\underline{\theta}_{a,n}^N = \left\{ \left( \sum_{k=0}^{n} \lambda^{n-k} \underline{\xi}_k^{Nt} \underline{\xi}_k^N \right)^{-1} \underline{\xi}_n^N \right\} \alpha_n^N$$

where alpha is a scalar, lambda is an omission factor and $\underline{\xi}_n^N = \alpha_{n-1}^N e_{a,n}^N$ calculation of the vector $\theta_{b,n}^N$ by recurrence from knowledge of $\theta_{a,n}^N$ and calculation of matrices $A_k$ representing the models, for k=1 to N.

According to particular characteristics, the method comprising the object of the present invention as explained briefly hereinabove includes a step of classifying modes obtained from the step of estimating modes by employing one of the two following constraints:

one single mode per class obtained from a given model and the estimates all have the same weight, independently of the origin of the estimate.

According to particular characteristics, the said signals are representative of accelerations of the structure of an airplane.

According to a second aspect, the present invention relates to a computer program that can be loaded into an information technology system, the said program containing instructions making it possible to employ the method constituting the object of the present invention as briefly explained hereinabove.

Since the particular advantages, objectives and characteristics of this program are similar to those of the method constituting the object of the present invention as briefly explained hereinabove, they will not be repeated here.

BRIEF DESCRIPTION OF THE DRAWINGS

Other advantages, objectives and characteristics of the present invention will become evident from the description hereinafter, provided for explanatory and in no way limitative purposes, and referring to the attached drawings, wherein.

DETAILED DESCRIPTION

Figure 1:
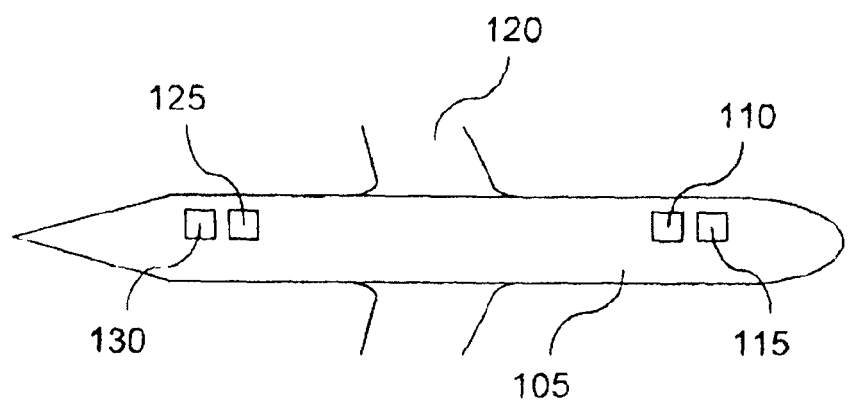
FIG. 1 schematically represents an airplane provided with a device capable of implementing the method constituting the object of the present invention.

FIG. 1 shows an airplane 105 equipped with two transducers 110 and 115 close to one another forward of wing unit 120 and with two transducers 125 and 130 close to one another aft of wing unit 120.

By way of explanation, only two pairs of closely positioned transducers are represented in FIG. 1. It nevertheless is noted that more than two pairs are employed in a real implementation of the present invention.

The term "closely positioned" refers here to transducers that receive signals strongly correlated with one another.

The closely positioned transducers receive substantially the same vibrations, offset in time and damped differently but according to a substantially linear transfer function. As an example, the transducers in question are accelerometers.

Figure 2:
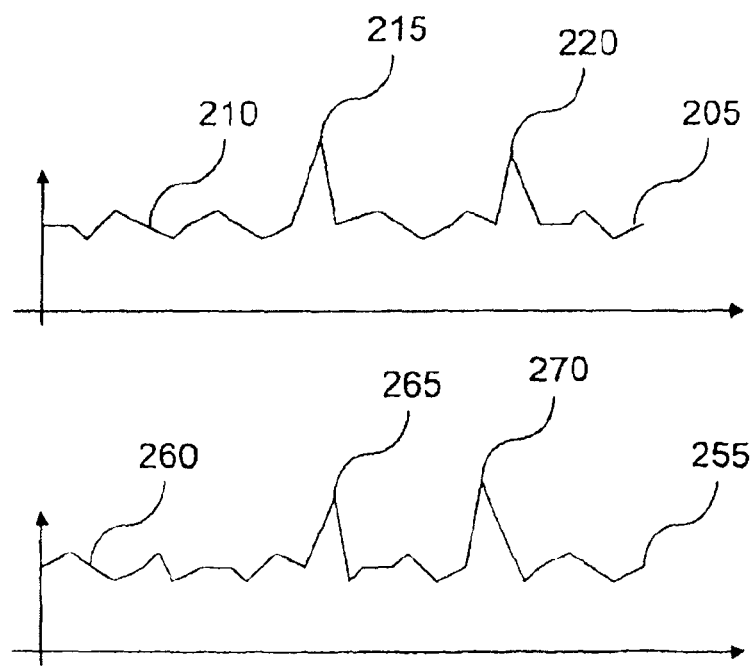
FIG. 2 represents signals emitted by two transducers of the device illustrated in FIG. 1.

In FIG. 2 it is observed that signal 205 emitted by a first transducer of a pair of transducers contains noise 210 as well as two peaks 215 and 220, and that signal 255 emitted by the second transducer of the same pair of transducers contains noise 260 and two peaks 265 and 270. Peak 265 corresponds to peak 215 damped and offset in time. Peak 220 corresponds to peak 270 damped and offset in time.

As is easily understood, the present invention permits an analysis of the structural properties of the airplane by employing assemblies (in this case pairs) of at least two closely positioned transducers. These structural properties include, for example, the spectral properties, the frequencies, amplitudes, original phases, damping phenomena, modes.

Figure 3:
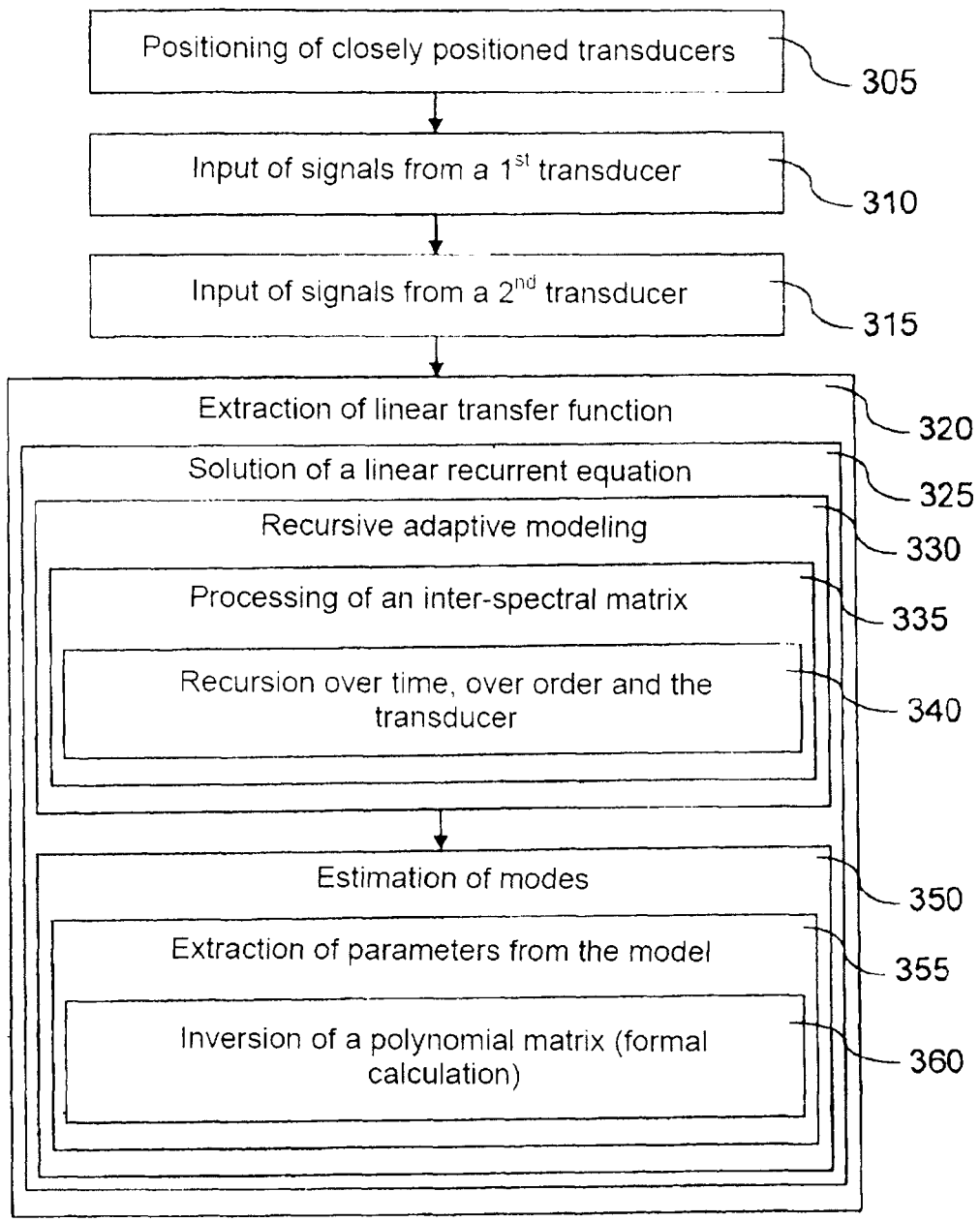
FIG. 3 represents, in the form of a logic diagram, steps employed in a first embodiment of the method constituting the object of the present invention.

In FIG. 3, in a first embodiment, it is seen that the method of frequency analysis constituting the object of the present invention begins with a step 305 of positioning, on the structure of a mechanical system subject to vibrations, of groups of a plurality of transducers. In each transducer group, at least one transducer referred to as "second" is positioned close to a transducer referred to as "first".

In the course of operation of the mechanical system, there are executed a step 310 of inputting signals emitted by a first transducer of a said transducer group and a step 315 of inputting signals emitted by at least one second transducer of the same transducer group. Each step of inputting signals emitted by a transducer includes a step of reducing the noise level of the signals emitted by the transducer. This noise reduction may be achieved transducer-by-transducer in known manner or on a vector containing, for each of its coordinates, a signal originating from a transducer. Preferably, this denoising function is assured by decomposition on a wavelet basis (algorithm of Stéphane Mallat). In the course of steps 310 and 315, for example, for a structure whose natural frequencies below 16 Hz are being sought, the signals emitted by transducers are sampled at a much higher frequency, for example of 256 Hz, in FIG. 6. It is noted that the use of wavelets permits simple and rapid processing.

In the course of a step 320, transfer functions are extracted by processing of signals emitted by the first transducer and each second transducer. In this way the model representative of the structural modes is considered to be linear, and frequency/damping pairs are followed on-line without taking into account the input, or in other words the injected excitation.

In the course of step 320, the signals emitted by the transducers are considered to be polynomials, and the information items are extracted from the signals emitted by the transducers, after modifications of phase and value of the said information items between the signals emitted by different transducers or different transducer groups have been taken into account.

In the course of step 320, there is executed a step 325 of solving a linear recurrent equation with coefficients varying slowly in time, in order to be able to estimate the models over a sufficiently stable time interval.

Step 325 includes:
a step 330 of recursive adaptive modeling of ARMA type over time (at each instant), order (for each order under consideration) and space of the transducers (for each transducer), and
a step 350 of estimating modes for each order according to the result of the step of adaptive modeling.

Figure 7:
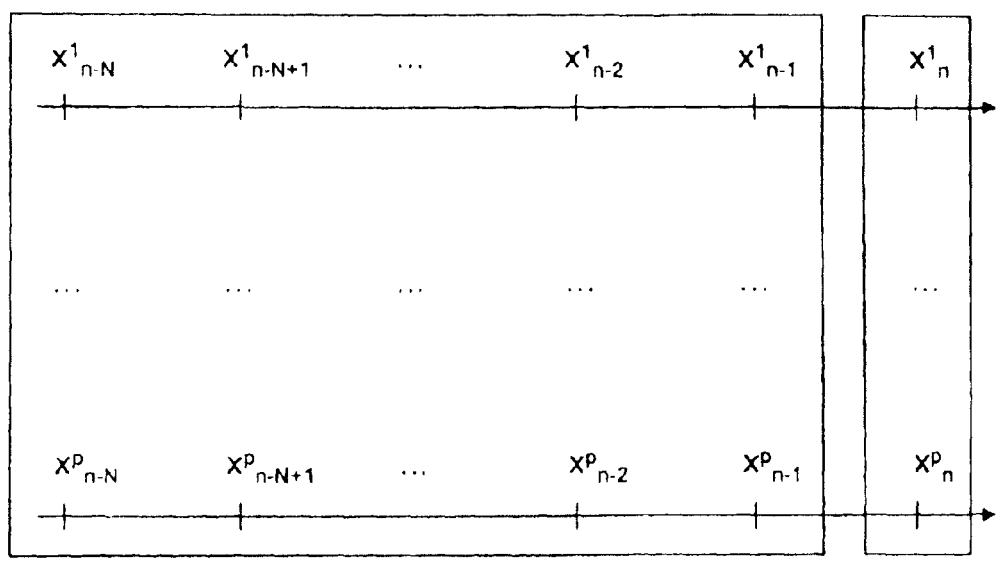

Step 330 achieves modeling of parametric type, of ARMA type (autoregressive moving average). The samples obtained from transducers are assembled as a vector, whose number of components is the number of transducers under consideration (see FIG. 7). For example, if there are four transducers, the vectors under consideration are of dimension four. More generally, the number of transducers of a group of closely positioned transducers is referred to as "p" in the rest of the description.

Step 330 achieves modeling known as "recursive in time", because it uses the last estimates obtained to update its parameters. In this embodiment, therefore, the present invention employs relationships between two consecutive instants, because they are considered to be correlated and coherent. In some embodiments, the two preceding instants are used for the temporal recursion.

The optimum order N of modeling is not necessarily known. Preferably, this optimum order N is not determined, so as to obtain a result in real time. On the other hand, the recursion is carried out as far as a sufficiently large order Nmax. In this way there is obtained a set of models that is sufficiently large that the information sought (the structural modes) is represented therein.

In the embodiment illustrated in FIG. 3, step 330 includes a step 335 containing a step of processing of a symmetric inter-spectral matrix, representing the spectral power density of each of the transducers on its main diagonal and the inter-spectra in the off-diagonal terms.

Step 335 includes a step 340 of recursion of the following steps over time, with initialization at instant n for the order N=0, including a recursion over the order of the model N=[1, 2, ..., Nmax]:
calculation of backward and forward linear prediction error vectors,
calculation of forward and backward partial correlation matrices,
calculation of backward and forward linear prediction error covariance matrices,
calculation of the forward and backward linear prediction error power matrix,
direct calculation of gain vectors, whose dimension is the number of transducers:

$$\underline{\theta}_{a,n}^N = \left\{ \left( \sum_{k=0}^{n} \lambda^{n-k} \underline{\xi}_k^{Nt} \underline{\xi}_k^N \right)^{-1} \underline{\xi}_n^N \right\} \alpha_n^N$$

where alpha is a scalar, lambda is an omission factor and calculation of the vector $\underline{\xi}_n^N = \alpha_{n-1}^N e_{a,n}^N$
$\theta_{b,n}^N$ by recurrence from knowledge of $\theta_{a,n}^N$ and
calculation of matrices $A_k$ representing the models, for k=1 to N.

Starting from the set of models obtained at the end of step 330, sorting is applied to extract the structural modes. The models are considered as ratios of polynomials (models known as "ARMA", the acronym for "AutoRegressive Moving Average", for autoregressive mobile mean or autoregressive with adjusted mean). To extract the values of parameters representing the structural modes, the covariance matrices Ea and Eb are minimized for each instant and for each order. For that purpose, there are calculated the vectors $\theta_a$ and $\theta_b$, which respectively represent the product of the inverse of matrix Ea by a vector $\epsilon_a$ and the product of the inverse of matrix Eb by a vector $\epsilon_b$.

To achieve these calculations in real time, the vector $\theta_{a,n}^N$ is calculated directly for all values from 1 to Nmax. Then $\theta_{b,n}^N$ is calculated by recurrence from knowledge of $\theta_{a,n}^N$.

The number of matrices $A_k$ (square matrices of dimension p), which are coefficient matrices of models to be estimated at instant n for all orders ranging from 1 to Nmax, is equal to Nmax×(Nmax−1)/2, or 105 for N=15.

The principle of classification of structural modes is to consider that, if a parameter having a given order is pertinent, it will be found at a higher order. The classification of parameters is not supervised, and consists in searching for similar objects obtained from different models. As explained hereinafter, constructions of trajectories are employed for this classification.

Step 350 furnishes parameters of each of the models constituting a set of redundant information items that makes it possible to reduce the variance of the estimated modes. Step 350 includes a step 355 of extracting parameters from the model according to the result of the adaptive modeling step. Step 355 includes a step 360 of inverting a polynomial matrix of order N and dimension equal to the number of transducers.

Step 360 includes a step 365 of Cholesky decomposition.

In its second particular embodiment, the method constituting the object of the present invention follows a real-time procedure, described with reference to FIG. 4, and dedicated to the analysis of test data for expanding the flight envelope. This embodiment makes it possible to process each information item before the next one appears, without taking into account the excitation injected into the structure.

The characteristics of the method completely satisfy the constraints of safety and cost reduction mentioned in the introduction, and make it possible to improve the procedure of expanding the flight envelope by furnishing a more efficient modal analysis.

The signals to be analyzed are acceleration measurements made on the primary structure of the airplane.

Figure 4:
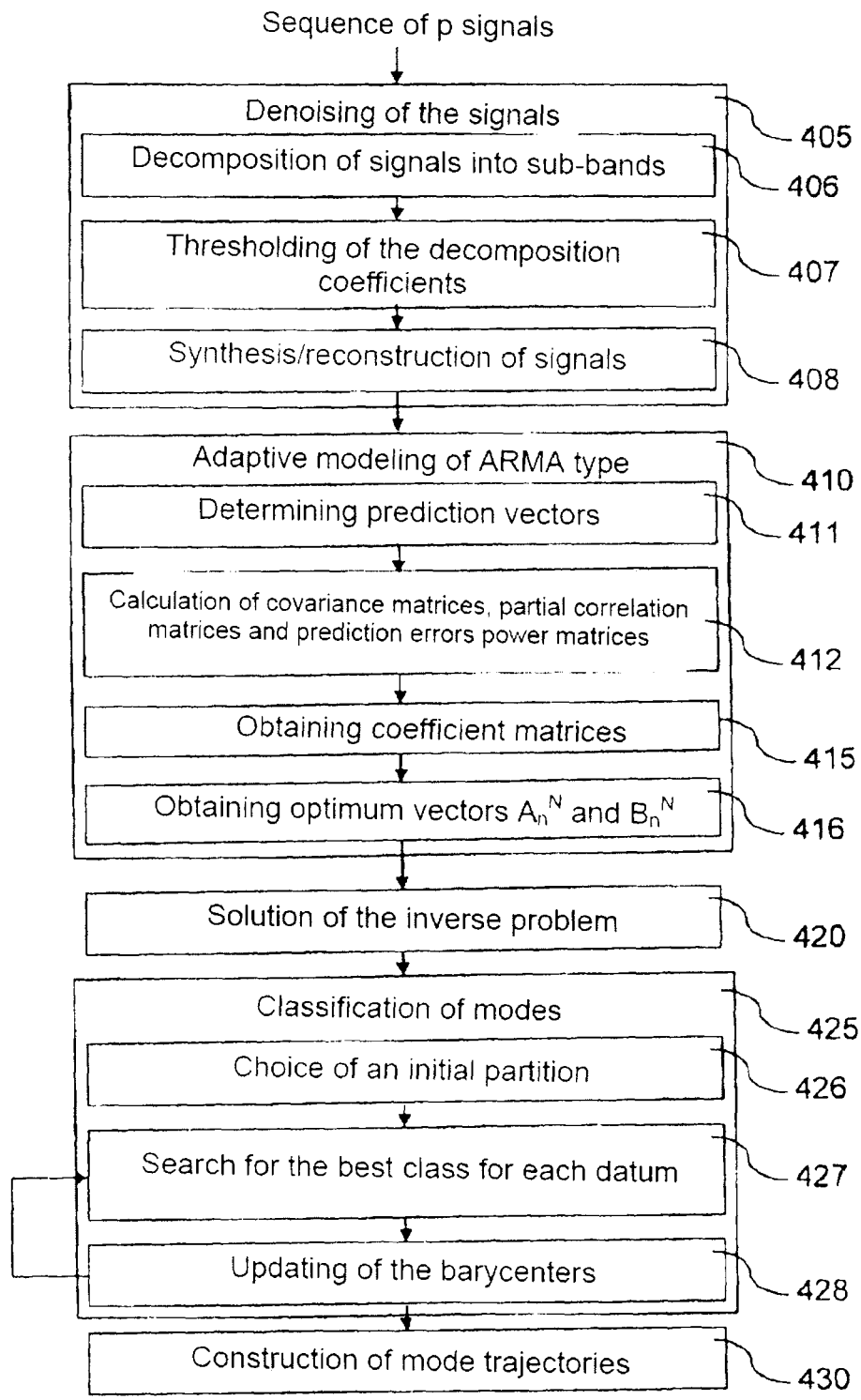
FIG. 4 represents, in the form of a logic diagram, steps employed in a second embodiment of the method constituting the object of the present invention.

Each of the operations of the real-time procedure for analysis of p signals of acceleration type, described with reference to FIG. 4, is detailed in the following paragraphs.

First step 405 of the analysis method consists in "denoising" the p signals emitted by the p transducers of the same group of closely positioned transducers, for example by means of the pyramidal algorithm proposed by S. Mallat, using orthonormalized bases of wavelets. The origin of this algorithm goes back to the studies of Burt and Adelson in 1983 relating to vision and image compression. This algorithm, which is extremely simple to employ, has a calculation load proportional to the number of samples to be processed.

Figure 5:
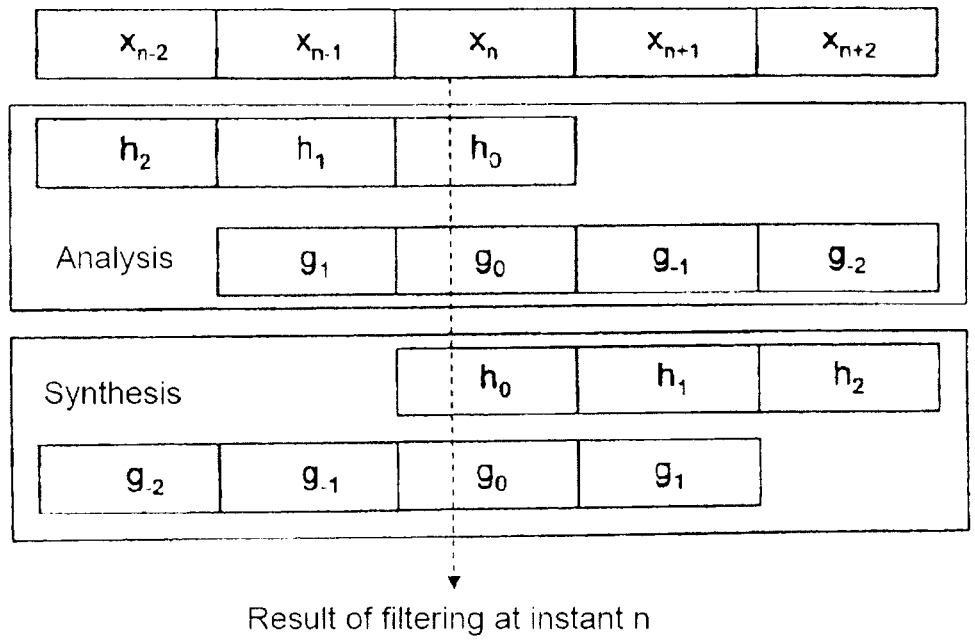
FIG. 5 represents an arrangement of filters employed during one of the steps illustrated in FIG. 4, FIG. 6 schematically represents the successive functions employed in one embodiment of a noise reduction system, FIG. 7 schematically represents, at each instant, the samples emitted by transducers constituting the inputs of the algorithm of the embodiment illustrated in FIG. 4, FIG. 8 schematically represents recursions employed in the second embodiment illustrated in FIG. 4, FIG. 9 schematically represents an evolution of classes of a non-supervised classification method of "dynamic clouds" type, and FIG. 10 provides an illustration of a validation window employed in the second embodiment illustrated in FIG. 4.

The nonlinear character of the processing complicates employment, all the more so because the filter bank is not causal. The filters are arranged in the manner illustrated in FIG. 5, by employing wavelets.

Mallat's algorithm is absolutely real-time, it is generalized to the simultaneous processing of p samples at each instant. The principle adopted is based on over-sampling of the signal in order to permit "denoising" by analysis and synthesis.

Thus, in the course of step 405, a step 406 of decomposing signals into sub-bands is first executed. In the course of this analysis or decomposition, the sequence formed by sampling of the continuous signal is initially considered as being the approximation of this signal on a certain scale related to the discretization (the sampling actually corresponds to the finest scale).

By convention, this approximation scale corresponds to j=0. We therefore start from data that belong to the sub-space $v_0$: the succession of samples $\{x_0, x_1 \ldots, x_k, \ldots\} = \langle f | \phi_{0,k} \rangle$, k∈z then constitutes the set of data that we wish to analyze. The relationship between the approximation sub-spaces is $v_{j-1} = v_j \oplus w_j$. It is then sufficient to decompose the discrete signal, or in other words the sequence of samples, over the two sub-spaces $v_1$ and $w_1$ in order to have the suite of samples at the resolution of $2^{-1}$, or in other words $\langle f | \psi_{1,k} \rangle$ and $\langle f | \phi_{1,k} \rangle$. The following relationships give the recurrence for two successive resolutions:

$$\langle f | \phi_{j,k} \rangle = \sum_{n \in Z} h_{n-2k} \langle f | \phi_{j-1,n} \rangle$$

and $$\langle f | \psi_{j,k} \rangle = \sum_{n \in Z} g_{n-2k} \langle f | \phi_{j-1,n} \rangle$$

These equations respectively represent the convolution products $g_{-n} * \langle f | \phi_{j-1,n} \rangle$ and $h_{-n} * \langle f | \phi_{j-1,n} \rangle$ followed by decimation by two. Thus the approximation coefficients $\langle f | \phi_{j,k} \rangle$ and the detail coefficients $\langle f | \psi_{j,k} \rangle$ on the scale j are calculated from those obtained on the scale j−1 by a simple operation of filtering by the filters $\hat{G}(f)$ and $\hat{H}(f)$ followed by decimation.

Then, in step 407, thresholding of the coefficients of the decomposition is applied, in the course of which only the coefficients of the first sub-band are retained.

A step 408 of synthesis or reconstruction is then executed, in the course of which reconstruction of the signal from knowledge of projections onto the approximation sub-spaces is achieved in the following way:

$$\sum_{k \in Z} \langle f | \phi_{j-1,n} \rangle \phi_{j-1,n} = \sum_{k \in Z} \langle f | \phi_{j,k} \rangle \phi_{j,k} + \sum_{k \in Z} \langle f | \psi_{j,k} \rangle \psi_{j,k} \Rightarrow \langle f | \phi_{j-1,n} \rangle =$$

$$\sum_{k \in Z} \langle f | \phi_{j,k} \rangle \underbrace{\langle \phi_{j,k} | \phi_{j-1,n} \rangle}_{h_{n-2k}} + \sum_{k \in Z} \langle f | \psi_{j,k} \rangle \underbrace{\langle \psi_{j,k} | \phi_{j-1,n} \rangle}_{g_{n-2k}}$$

or: $\langle f | \phi_{j-1,n} \rangle = \sum_{k \in Z} h_{n-2k} \langle f | \phi_{j,k} \rangle + \sum_{k \in Z} g_{n-2k} \langle f | \psi_{j,k} \rangle$ The reconstruction is a dual operation of the preceding. It is achieved by digital filtering preceded by interpolation over the approximation and detail coefficients resulting from the decomposition.

Figure 6:
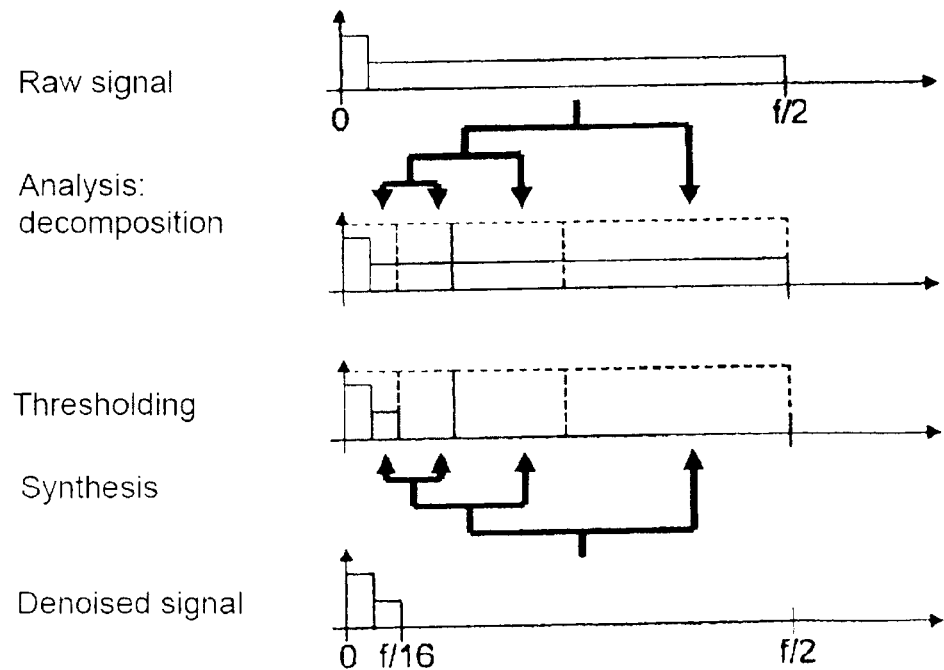

The general structure of the "denoiser" is therefore that illustrated in FIG. 6. It is noted that the maximum frequency under consideration is half of the sampling frequency f. In the raw signal, the signal being sought is located within the lowest frequencies. After decomposition of the signal over frequency bands ranging from 0 to f/16, from f/16 to f/8, from f/8 to f/4 and from f/4 to f/2, thresholding is applied by setting the coefficients of the wavelets to zero. Then a synthesis is executed to furnish a denoised signal containing the sought signal.

Then, in the course of a step 410, adaptive modeling of ARMA type ("AutoRegressive Moving Average") is executed. This step of modeling of the signal is of parametric type, a type that makes it possible to obtain, for the studied signal, a spectral analysis that is recursive in time, in order and over the space of the transducers.

Step 410 includes a step 411 of determining a forward linear prediction vector and a backward linear prediction vector. Extended to the vector case, each determination of a prediction vector consists in expressing $\hat{x}_n$ in as a linear combination of the last N vectors of samples, with the representation illustrated in FIG. 7, which represents the forward linear prediction in vector form over the space of the p transducers.

It therefore involves modeling the signal directly in the space of the time. If $x_n$ represents the sequence of samples, the model is then:

$$\hat{x}_n = \sum_{k=1}^{N} A_k x_{n-k}$$

It is recalled that the vector $x_n$ has the p current samples of the p transducers for components. In this expression, the $A_k$ are matrices of dimension p that correspond to the number of transducers, N being the order of the modeling.

The generalization of the scalar methods yields a new notation for the error and its prediction:

$$e_n = x_n - \hat{x}_n \Rightarrow e_n = x_n - \sum_{k=1}^{N} A_k x_{n-k} \quad (1)$$

Or:

$$e(z) = \left(1 - \sum_{k=1}^{N} A_k z^{-k}\right) x(z) = \Phi(z) x(z) \quad (2)$$

From an external viewpoint, $e_n$ is the output of a FIR filter excited by the vector sequence of samples $x_n$. The property of linearity makes it possible to invert the process: $x_n$ then appears as the output of a filter excited by $e_n$. This filter is obtained by inverting the polynomial matrix $\Phi(z)$, it is stable and of IIR type (acronym for "infinite impulse response").

For determination of a backward linear prediction, the estimate $\hat{x}_{n-N}$ of $x_{n-N}$ is expressed as a linear combination of the vectors $\{x_{n-N+k}\}_{k=1,\ldots,N}$. The properties are analogous to those obtained for the forward linear prediction.

Then, in the course of a step 412, covariance matrices, forward and backward partial correlation matrices and forward and backward prediction error power matrices are calculated.

Then the a priori and a posteriori, forward and backward linear prediction error covariance matrix is minimized, constructed from the concepts of forward and backward linear prediction defined beforehand. The a posteriori forward linear prediction error covariance matrix is defined by:

$$E_{a,n}^N = \sum_{k=1}^{n} \lambda^{n-k} \underline{e}_k^t \underline{e}_k = \sum_{k=1}^{n} \lambda^{n-k} (\underline{x}_k - {}^t A_n^N (\underline{x}_{k-1}^N))^t (\underline{x}_k - {}^t A_n^N (\underline{x}_{k-1}^N))$$

where $0 \ll \lambda \leq 1$ is referred to as omission or adaptation factor.

In the course of a step 415, there are obtained matrix coefficients of the model of order N for all values of N. For this purpose, during a step 416, the optimum vector $A_n^N$ is obtained when the covariance matrix $E_{a,n}^N$ is minimum, or in other words:

$$\frac{\partial E_{a,n}^N}{\partial A_n^N} = 0$$

In the course of a step 417, similar reasoning based on the estimate of the a priori backward linear prediction error covariance matrix yields $$E_{b,n}^N = \sum_{k=1}^{n} \lambda^{n-k} (\underline{x}_{k-N} - {}^t B_n^N (\underline{x}_k^N))^t (\underline{x}_{k-N} - {}^t B_n^N (\underline{x}_k^N))$$

An algorithm entitled "ESA" is executed in the scope of the multi-transducer extension for calculation of the two vectors defined below:

$$\theta_{b,n}^N = (E_{b,n}^N)^{-1} \epsilon_{a,n}^N$$

$$\theta_{a,n+1}^N = (E_{a,n+1}^N)^{-1} \epsilon_{a,n+1}^N$$

The vector $\theta_{a,n}^N$, calculated directly by virtue of an "ESA" algorithm, is the product of a matrix by a vector. The matrix is the weighted sum up to the instant n+1 of the dyadic product of the vector $\xi_{a,n}^N$, and the vector is this same vector at the instant n+1, or in other words $\xi_{a,n+1}^N$.

The vector $\theta_{b,n+1}^N$ is obtained by recurrence from $\theta_{a,n}^N$.

Then, in the course of a step 420, the solution of the inverse problem is found, or in other words the extraction of parameters from the models. Starting from the equations of the model extended to the multi-transducer case (1) and (2) described hereinabove:

$$\underline{e}_n = \underline{x}_n - \hat{\underline{x}}_n \Rightarrow \underline{e}_n = \underline{x}_n - \sum_{k=1}^{N} A_k \underline{x}_{n-k} \quad (1)$$

Or:

$$\underline{e}(z) = \left(1 - \sum_{k=1}^{N} A_k z^{-k}\right) \underline{x}(z) = \Phi(z) \underline{x}(z) \quad (2)$$

Where $$\Phi(z) = 1 - \sum_{k=1}^{N} A_k z^{-k}$$

is a polynomial matrix in z of order N=[1,Nmax], of dimension p×p, where p is the number of transducers analyzed.

e(z) is an unknown error vector, whereas its covariance matrix is estimated. Therefore, to make it appear, we will calculate:

$$e(z)^t e(z) = \Phi(z) x(z)^t x(z)^t \Phi(z)$$

Or the inter-spectral matrix:

$$x(z)^t x(z)^t = \Phi(z)^{-1} e(z)^t e(z) \Phi(z)$$

This matrix is symmetric, the spectral power density of each of the transducers appears on its main diagonal. The off-diagonal terms are the inter-spectra. The extraction of parameters from the models consists in executing the inversion of the polynomial matrix $\Phi(z)$ of order N and dimension p at each instant and for each order.

For that purpose, the Cholesky decomposition of the matrix $e(z)^t e(z) = L'L$ yields:

$$x(z)^t x(z) = \Phi(z)^{-1} L(z)^t L(z)^t \Phi(z)^{-1} = (\Phi(z)^{-1} L(z))^t (\Phi(z)^{-1} L(z)) = (\Lambda(z)^{-1} U(z) L(z))^t (\Lambda(z)^{-1} U(z) L(z))$$

Where $$x(z)^t x(z) = \Lambda(z)^{-1t} \Lambda(z)^{-t} \begin{bmatrix} \|F_{1,1}\|^2 & & \|F_{p,1}\|^2 \\ & \vdots & \\ \|F_{p,1}\|^2 & & \|F_{p,p}\|^2 \end{bmatrix}$$

The polynomials F represent the numerators of the different transfer functions, while the denominators (in fact, the only denominator, according to the superposition theorem) are the natural values.

Let us set $$F_{i,j}^N(z) = \sum_{q=0}^{N} d_Q^t z^{-q} \Rightarrow F_{i,j}^N(z)^t F_{i,j}^N(z) = \sum_{n=0}^{N} \sum_{m=n}^{n-N} a_{n,m} a_n z^{-m}$$

$$F_{i,j}^N(z)^t F_{i,j}^N(z) =$$

$$\begin{bmatrix} a_0 a_N & a_1 a_N & a_2 a_N & \cdots & \cdots & a_N a_N & 0 & \cdots & \cdots & 0 \\ & a_0 a_{N-1} & & & & & \vdots & & & \vdots \\ & & a_0 a_{N-2} & & & & \vdots & & & \vdots \\ & & & a_0 a_0 & & & \vdots & & & \vdots \\ 0 & \cdots & \cdots & \cdots & \cdots & 0 & \vdots & & & \vdots \\ & & & & & a_0 a_0 & a_0 a_1 & & a_0 a_N & \vdots \end{bmatrix} \begin{bmatrix} Z^N \\ Z^{N-1} \\ \vdots \\ \vdots \\ \vdots \\ \vdots \\ \vdots \\ Z^{-N} \end{bmatrix}$$

The coefficients of the numerator are the square roots of the N+1 elements of the N+1-th column of the inter-spectral matrix (without the sign).

Figure 8:
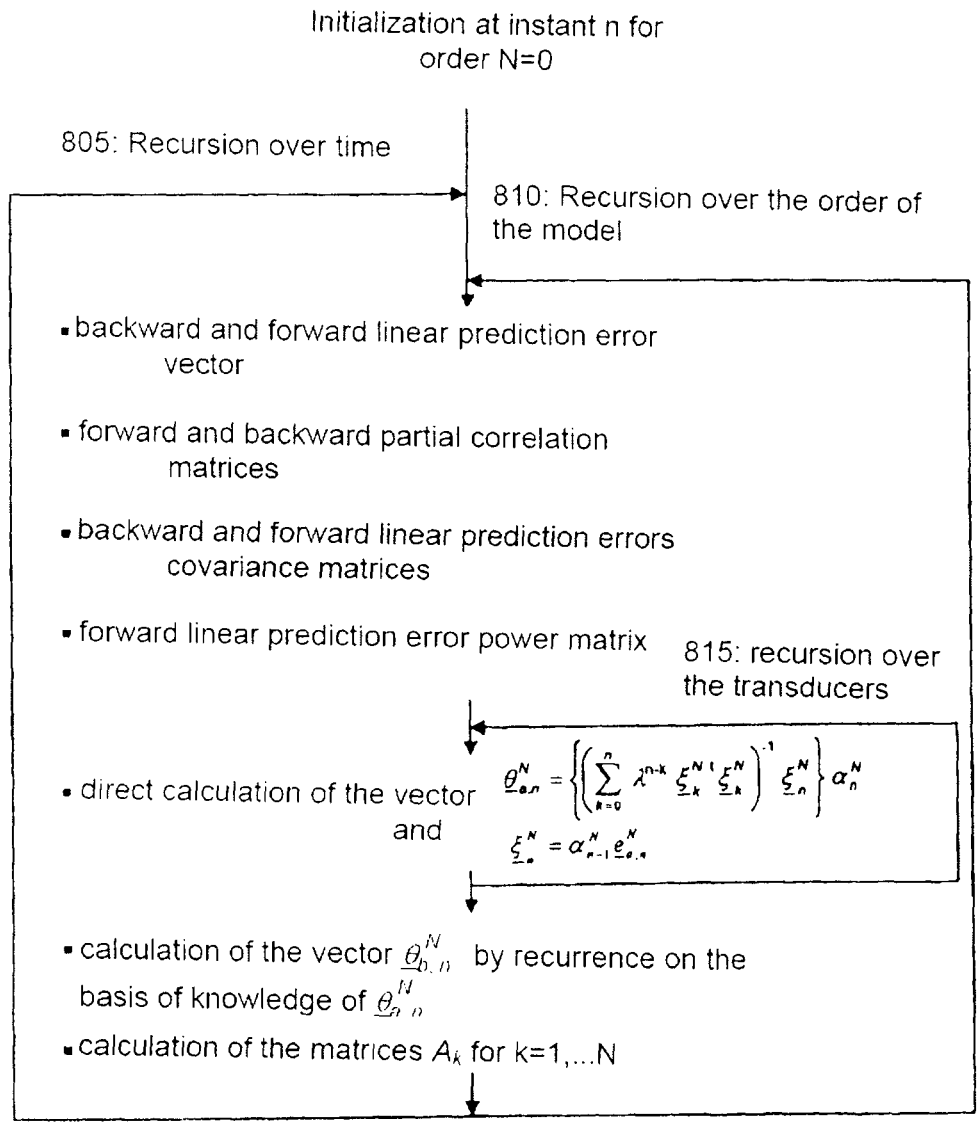

The processing of the adaptive modeling can be represented as in FIG. 8. The interleaving of the three recursions 805, 810 and 815 can be seen in this scheme for processing the multi-transducer modeling.

Then, in the course of a step 425, a classification of modes is executed. At each instant, N models of dimension {1:p: N*p} are estimated, where p is the number of transducers. The extraction of parameters from each of the models (values of frequency and damping) is a set of redundant information items, which makes it possible to reduce the variance of the estimate. We now try to classify these data obtained from the modeling in the sense of a certain criterion under the following constraints:

one single mode per class obtained from a given model,
the estimates all have the same weight, independently of the origin of the estimate.

The absence of a priori knowledge (in particular of the density) made it necessary to favor a non-supervised classification method of "dynamic cloud" type, which consists in finding the natural (implicit) classes in order to collect non-labeled data.

Figure 9:
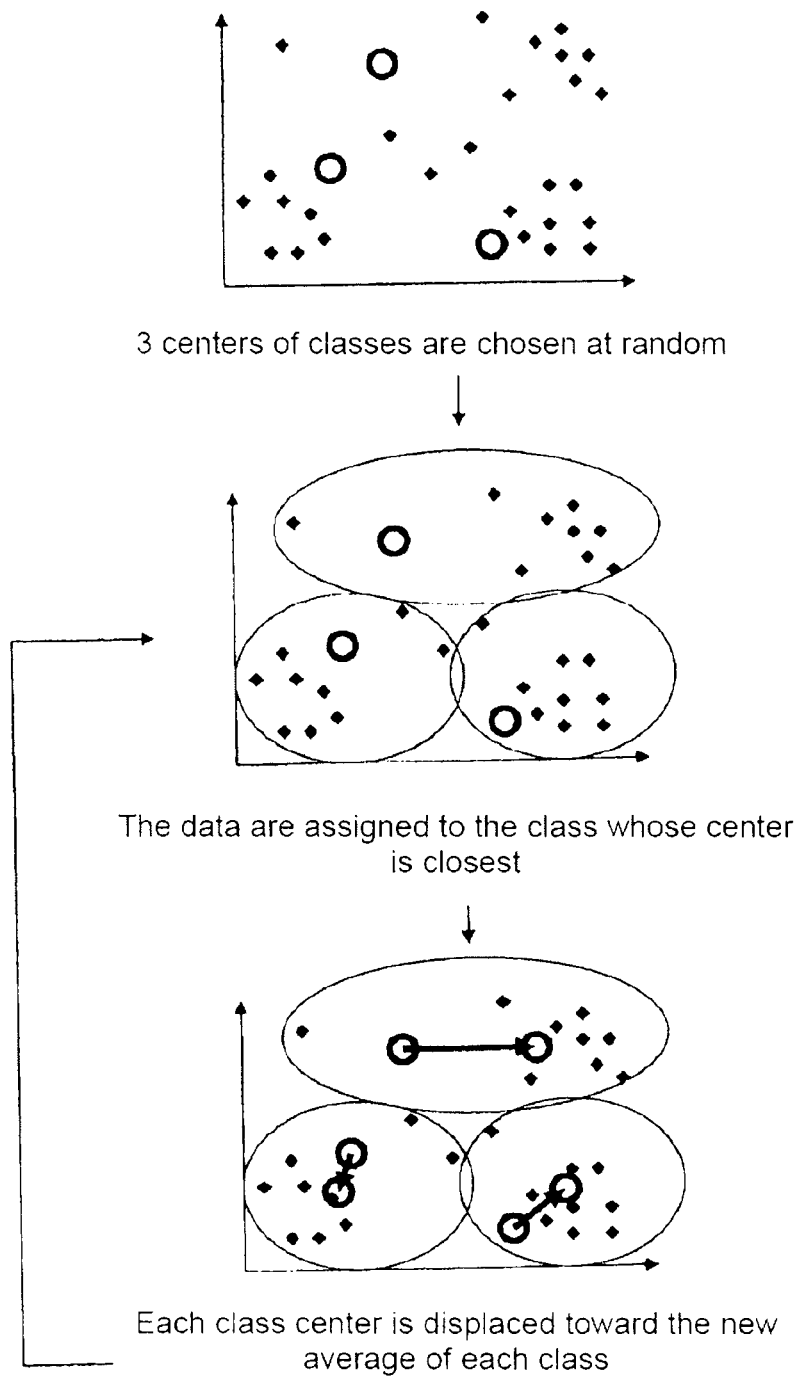

This method, illustrated hereinafter in FIG. 9, adequately satisfies all of the requirements according to the following algorithm:

in the course of a step 426, a choice of an initial partition into K classes is made, in the course of a step 427, a systematic search for each datum of the best class is executed; calculation of the distance of the data from the barycenters and assignment of the element to the class whose center is closest to it (for example, by using a Euclidian or Kullback-Leibler distance) and in the course of a step 428, an update of the barycenters of the "emitter" class and of the "receiver" class is applied.

Then steps 427 and 428 are repeated until convergence.

In the course of a step 430, a construction of trajectories of modes is performed.

The problem consists in following, in real time, the trajectories of a set of targets corresponding to the frequencies of modes whose number evolves in time. The structure of the algorithm is built around one Kalman filter per track being followed. When a set of "measurements" is furnished by the models, an attempt is made to correlate them with existing tracks. The objective here is to select, among the measurements received, those that are capable of originating from the target from which the measurement is predicted. A principle often used consists in defining a window, commonly known as "gating", around the prediction made.

The general processing architecture is based on the following principles:

prediction of the state at the instant n+1, knowing n from known trajectories, the association of measurements with targets consists in comparing the measurements with those predicted on the basis of known trajectories. This processing should make it possible not only to maintain the already existing tracks but also to initialize new tracks and if necessary to eliminate those that correspond to targets that have moved out of the observation space. The performances of the track follower depends on the quality of these functions.

filtering, with updating of the state, of the Kalman gain as well as the covariance matrices.

In this procedure, the Kalman filter makes it possible to follow several targets for which prediction has a fundamental role. For each target, it furnishes a filtered estimate of the state in the sense of minimum variance, predicts the state and permits calculation of the "gating".

The solution is composed of the set of two systems of prediction and filtering equations, or:

| Prediction equations | |
| --- | --- |
| Calculation of the predicted state | $\hat{x}(n+1|n) = A\hat{x}(n|n)$ |
| Calculation of the covariance matrix of the predicted state | $P_{n+1|n} = AP_{n|n}A^T + Q_n$ |
| Calculation of the predicted measurement | $\hat{z}(n+1|n) = H\hat{x}(n+1|n)$ |

| Filtering equations | |
| --- | --- |
| Calculation of the innovation | $\tilde{z}(n+1|n) = \hat{z}(n+1) - \hat{z}(n+1|n)$ |
| Calculation of the covariance matrix of the innovation | $S_{n+1} = HP_{n+1|n}H^T + R_n$ |
| Calculation of the filter gain (Kalman gain) | $K_{n+1} = P_{n+1|n}H^T S_{n+1}^{-1}$ |
| Estimate of the state at the instant n+1 | $\hat{x}(n+1|n+1) = \hat{x}(n+1|n) + K_{n+1}$ |
| Calculation of the associated covariance matrix | $P_{n+1|n+1} = (I - K_{n+1}H)P_{n+1|n}$ |

The validation window makes it possible, for each target, to select the measurements capable of belonging to the target. The principle is to define a zone, a volume in the observation space, around the predicted measurement. The size of this zone is defined by virtue of the statistical properties of the predicted measurement (Gaussian in the present case). In general, the "dimension" of this volume must be carefully chosen. In fact, the sorting of the measurements depends on it, as does the probability that the measurement originating from the target will be within the interior of the surface bounding this volume.

Figure 10:
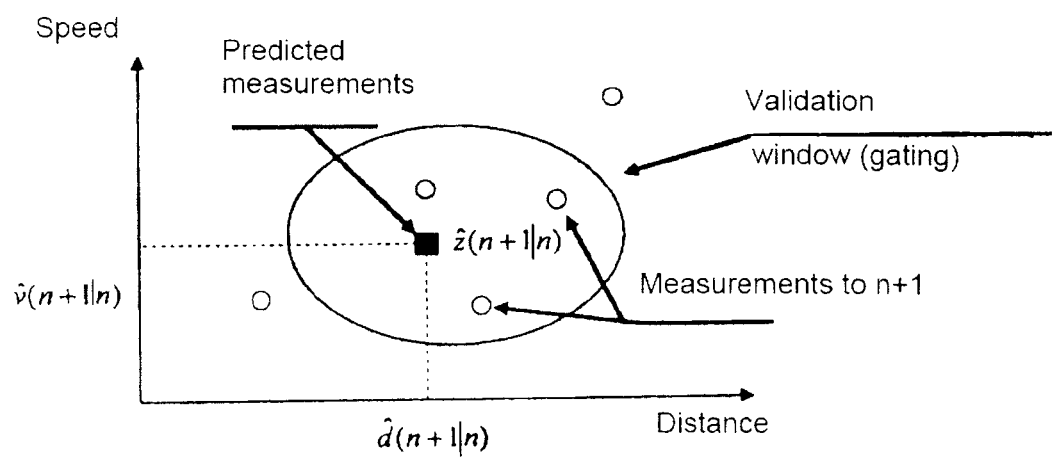

FIG. 10 provides an illustration of the validation window.

The technique of associating the measurement and the target is the central part of the procedure for following the target. Numerous techniques exist, among which some do not manage the appearance and disappearance of tracks. It is therefore necessary to provide a supplementary mechanism in order to achieve this management. A simple approach consists in adopting the following rules:

rule 1: Every measurement not associated with any existing track is considered as the initialization of a new track.

rule 2: A track is confirmed (detected) if at least Nd consecutive measurements have been associated with in.

rule 3: A track is considered as disappeared if at least Nl consecutive measurements have not been associated with it.

The Hungarian Method makes it possible to solve the problem of assigning estimates to measurements by searching for a minimum cost by virtue of the following particular solution method:

Let m be resources to be assigned to m tasks and let C be the matrix of assignment costs. An arbitrary assignment is defined by m pairs denoted (1,x), (2,y), ... (k, t), ... (m, u), where (x, y, ... u): permutation of {1, 2, ..., m}. To a particular assignment there corresponds a total expense or cost:

$$F(x, y, \ldots t, \ldots, u) = C1,x + C2,y + \ldots + Ck,t + \ldots + Cm,u$$

The problem then consists in determining (x, y, ... t, ..., u) in such a way as to make F minimum.

To employ the method constituting the object of the present invention, there is provided, in a preferred embodiment of the present invention, a computer for general use furnished with a computer program that can be loaded into this computer, the said program containing instructions implementing the steps and algorithms detailed hereinabove.

The invention claimed is:

1. A method of frequency analysis of data using at least one pair of closely positioned vibration transducers, comprising:
   inputting signals emitted by a first vibration transducer of the at least one pair of closely positioned vibration transducers,
   inputting signals emitted by a second vibration transducer of the at least one pair of closely positioned vibration transducers, the first and second vibration transducers being closely positioned so that the signals emitted by the second vibration transducer are strongly correlated with the signals emitted by the first vibration transducer,
   estimating, for each said vibration transducer, a transfer or model function constructed from the set of signals of the first vibration transducer and the second vibration transducer, and
   extracting structural properties of a system from each of the estimated models.

2. A method according to claim 1, wherein for said extracting, the signals emitted by each said pair of vibration transducers are considered as polynomials.

3. A method according to claim 1, wherein for said extracting, a linear recurrent equation with coefficients varying slowly in time and in space between the vibration transducers is solved.

4. A method according to claim 1, wherein said extracting includes:
   recursive adaptive modeling over time, order and space of the vibration transducers, and
   estimating modes for each order according to a result of said recursive adaptive modeling.

5. A method according to claim 4, wherein each of said inputting signals emitted by the vibration transducers includes, preceding said recursive adaptive modeling, reducing, in real time, a level of noise of the signals emitted by the vibration transducers.

6. A method according to claim 4, wherein said estimating modes includes extracting parameters from a model according to a result of said recursive adaptive modeling.

7. A method according to claim 6, wherein said extracting parameters from the model includes inverting a polynomial matrix of order N and of dimensions equal to the number of vibration transducers.

8. A method according to any one of claims 4 to 7, wherein said estimating modes furnishes parameters of each of the models constituting a set of redundant information items to reduce a variance of estimated modes.

9. A method according to claim 4, wherein said recursive adaptive modeling achieves modeling of a parametric type.

10. A method according to claim 4, wherein said adaptive modeling achieves Autoregressive Moving Average (ARMA) modeling.

11. A method according to claim 10, wherein said ARMA modeling is effected at each instant, for each said vibration transducer and for all orders under consideration.

12. A method according to claim 4, further comprising inverting a polynomial matrix, which is a symmetric interspectral matrix representing a spectral power density of each of the vibration transducers on its main diagonal and interspectra in other entries.

13. A method according to claim 4, wherein said recursive adaptive modeling includes recursion of the following over time, with initialization at instant n for the order N=0, including a recursion over the order of the model N=[1, 2, ..., Nmax]:
   calculation of backward and forward linear prediction error vectors,
   calculation of forward and backward partial correlation matrices,
   calculation of backward and forward linear prediction error covariance matrices,
   calculation of the forward and backward linear prediction error power matrix,
   direct calculation of gain vectors $$\theta_{a,n}^N = \left\{ \left( \sum_{k=0}^{n} \lambda^{n-k} \xi_k^{Nt} \xi_k^N \right)^{-1} \xi_n^N \right\} \alpha_n^N$$

where alpha is a scalar, lambda is an omission factor and
   $\xi_n^N = \alpha_{n-1}^N e_{a,n}^N$ calculation of the vector
   $\theta_{b,n}^N$ per recurrence from knowledge of $\theta_{a,n}^N$ and
   calculation of matrices $A_k$ representing the models, for k=1 to N.

14. A method according to claim 4, further comprising classifying modes obtained from said estimating modes by employing one of the two following constraints:
   one single mode per class obtained from a given model, and
   the estimates all have a same weight, independently of an origin of the estimate.

15. A non-transitory computer-readable storage medium storing computer-readable instructions that, when executed by a computer, cause the computer to perform a method according to claim 1.

* * * * *